Feb. 15, 1955 P. CASEY 2,701,906
OILER FOR MACHINE SHOP SHAPER CUTTING TOOLS
Filed Nov. 5, 1953 3 Sheets-Sheet 1
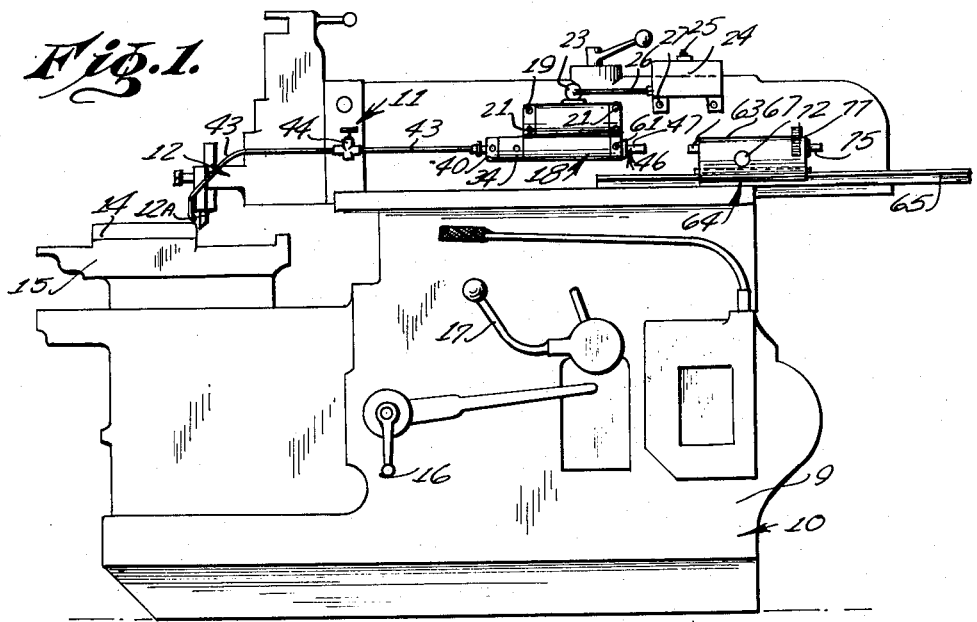
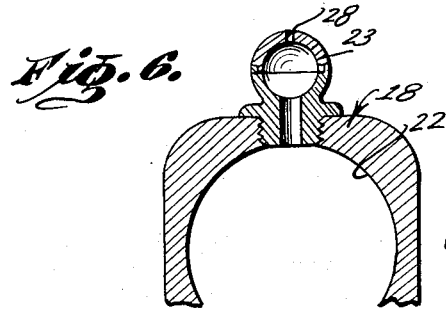
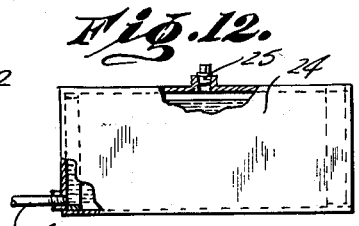
INVENTOR.
Patrick Casey
BY Victor J. Evans & Co.
ATTORNEYS Feb. 15, 1955    P. CASEY    2,701,906
OILER FOR MACHINE SHOP SHAPER CUTTING TOOLS
Filed Nov. 5, 1953    3 Sheets-Sheet 2
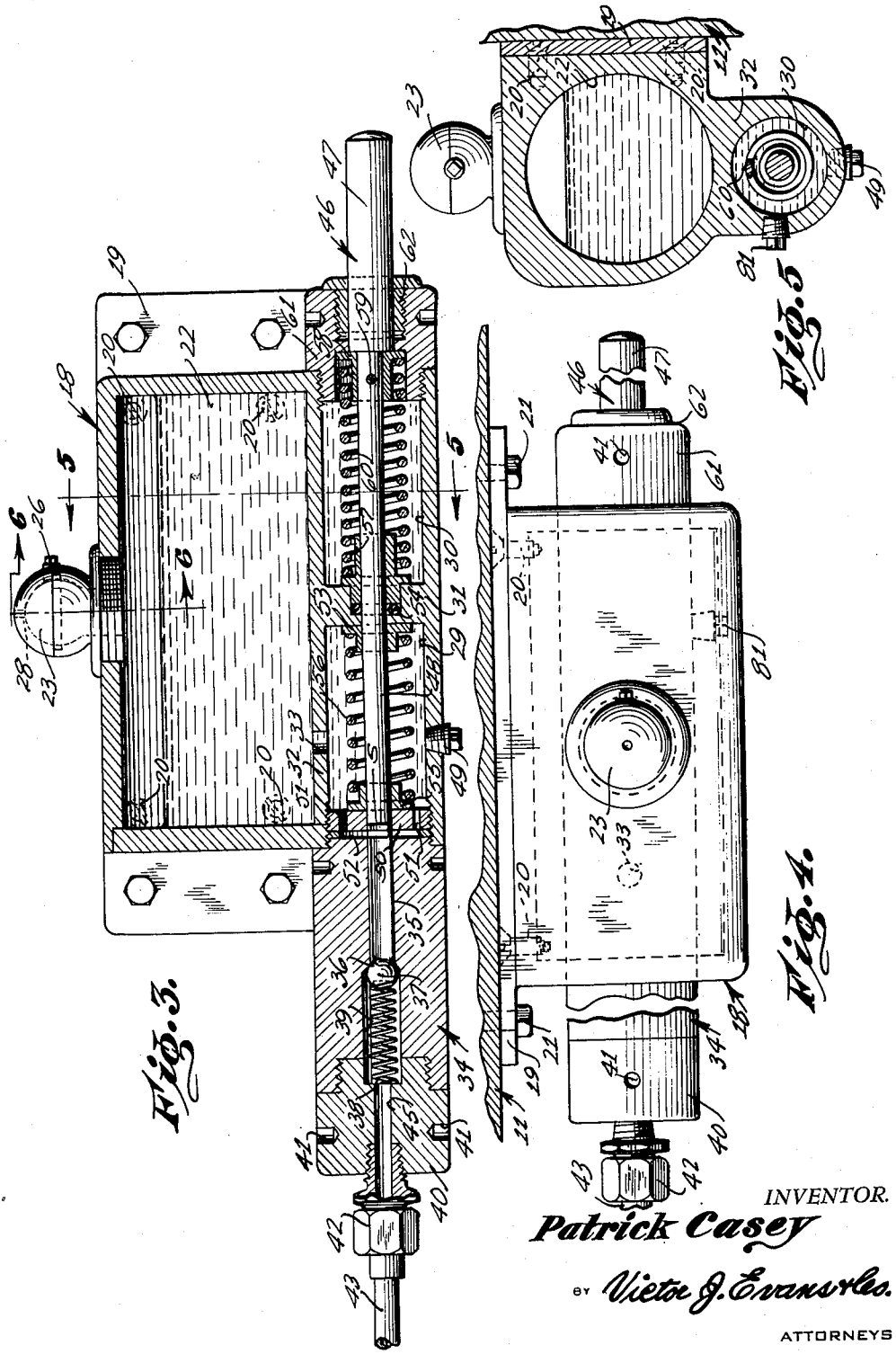
INVENTOR.
Patrick Casey
BY Victor J. Evans &Co.
ATTORNEYS Feb. 15, 1955   P. CASEY   2,701,906
OILER FOR MACHINE SHOP SHAPER CUTTING TOOLS
Filed Nov. 5, 1953   3 Sheets-Sheet 3
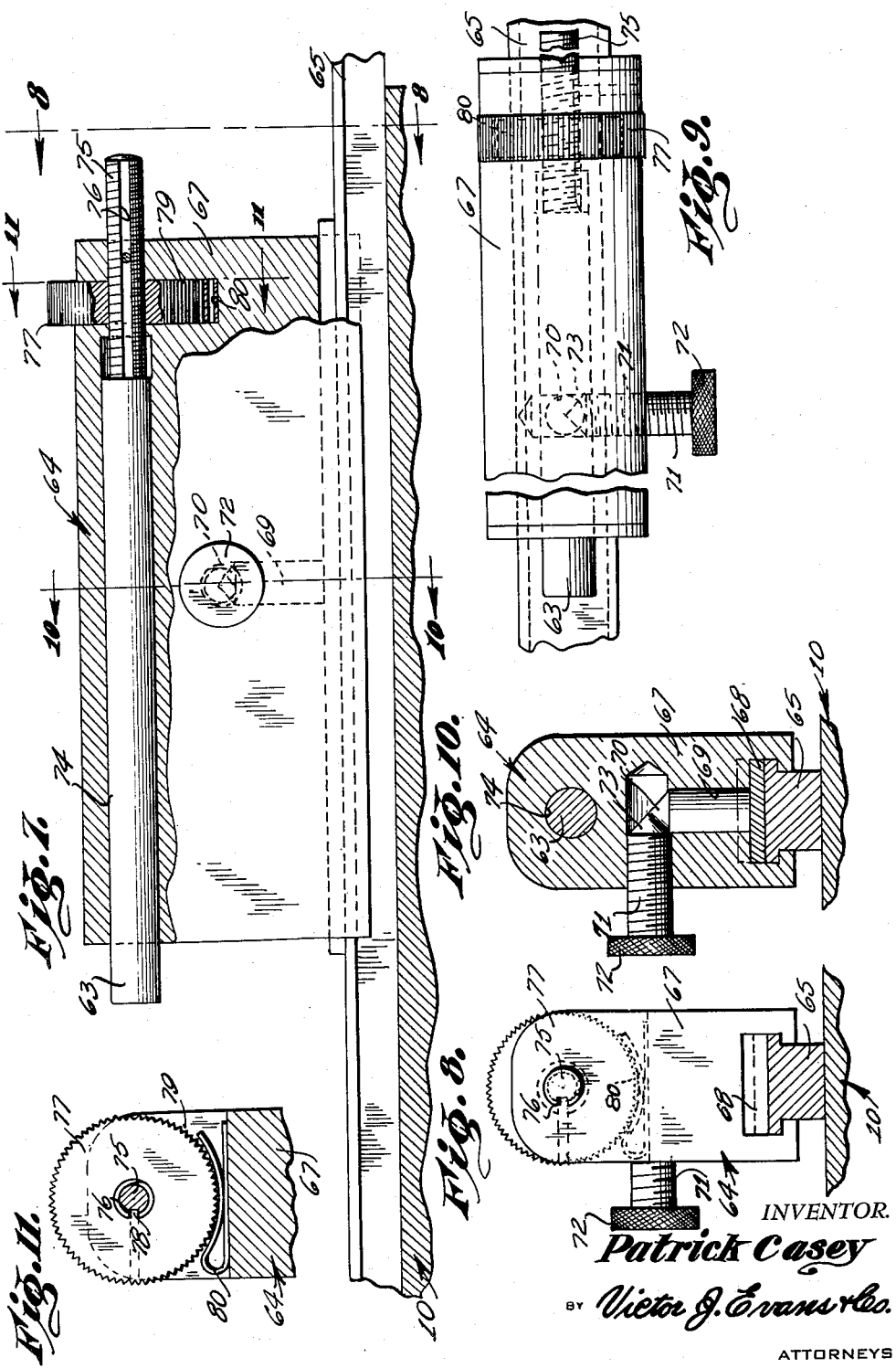
INVENTOR.
Patrick Casey
BY Victor J. Evans & Co.
ATTORNEYS

United States Patent Office 2,701,906
Patented Feb. 15, 1955

2,701,906

OILER FOR MACHINE SHOP SHAPER CUTTING TOOLS

Patrick Casey, Napa, Calif.

Application November 5, 1953, Serial No. 390,331

6 Claims. (Cl. 29—106)

This invention relates to an oiler or lubricating assembly, and more particularly to an oiler for a machine tool such as a shaper.

The object of the invention is to provide a lubricating assembly for a machine tool such as a shaper whereby sufficient lubrication will be supplied to the cutting tool during operation of the machine, the lubrication being cutting oil or the like.

Another object of the invention is to provide an oiler which is adapted to be actuated as the ram of the shaper or other machine tool reciprocates whereby a predetermined quantity of oil will be supplied to the cutting tool at exactly the right location to insure efficient operation of the machine.

A further object of the invention is to provide a tool oiler which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of a machine such as a shaper equipped with the oiler of the present invention.

Figure 2 is a fragmentary top plan view of the oiler of Figure 1.

Figure 3 is a longitudinal sectional view taken through the pump housing.

Figure 4 is a plan view of the pump shown in Figure 3.

Figure 5 is a sectional view taken on the line 5—5 of Figure 3.

Figure 6 is a sectional view taken on the line 6—6 of Figure 3.

Figure 7 is a side elevational view of the adjustable stop, with parts broken away and in section.

Figure 8 is a sectional view taken on the line 8—8 of Figure 7.

Figure 9 is a plan view of the adjustable stop.

Figure 10 is a sectional view taken on the line 10—10 of Figure 7.

Figure 11 is a sectional view taken on the line 11—11 of Figure 7.

Figure 12 is a side elevational view showing an auxiliary reservoir, with parts broken away and in section.

Referring in detail to the drawings, the numeral 10 designates a conventional machine which may be a shaper and the shaper 10 may include a stationary support member 9 and a reciprocating head or ram 11. Carried by the ram 11 is a cutting tool holder 12, Figure 1, and the cutting tool 12A is adapted to operate on a work piece 14 mounted on a table 15. The shaper 10 may have a conventional construction and suitable control members 16 and 17 may be provided for controlling the operation of the machine.

The present invention is directed to an oiler or lubricating assembly for supplying oil to the cutting tool 12A so as to insure that the cutting tool operates on the work piece 14 with a high degree of accuracy and efficiency. The oiler includes a pump housing 18, Figures 3 and 4, which is secured to a plate 19 by suitable screws or bolts 20, and the plate 19 is secured to the reciprocating ram 11 by bolts 21. Arranged in the housing 18 is a reservoir 22 for holding suitable lubricating oil, and a filling plug 23 is detachably connected to the housing. If desired an auxiliary reservoir 24 may be provided, and the reservoir 24 may also have a filling plug 25, there being a conduit 26 interconnecting the reservoir 24 to the plug 23 whereby oil can flow by gravity from the reservoir 24 to the reservoir 22. Suitable bolts or screws 27 can be provided for securing the reservoir 24 to the ram 11. The plug 23 may be provided with a vent opening 28, Figure 6, for permitting air to enter the reservoir as oil flows therefrom.

The housing 18 is provided with a pair of chambers 29 and 30, Figure 3. A partition 31 separates the chambers 29 and 30, and a bottom wall 32 separates the reservoir 22 from these chambers. An opening 33 is provided in the bottom wall 32 whereby oil from the reservoir 22 can flow into the chamber 29. Detachably connected to the housing is a head 34 which is provided with a bore 35. Arranged within the head 34 is a valve seat 36, and a ball valve 37 is mounted for movement into and out of closing relation with respect to the valve seat 36. A coil spring 38 serves to normally urge the valve 37 into closing relation with respect to the valve seat 36, and the spring 38 is positioned in a cutout 39 in the head 34. A plug 40 is detachably connected to an end of the head 34, and the plug 40 is provided with a passageway 45 that communicates with the cutout 39, for the egress therethrough of lubricating oil. The plug 40 may be provided with recesses 41 whereby a suitable tool can be arranged in engagement with these recesses for rotating the plug 40 when it is to be removed or replaced. A fitting 42 connects a conduit 43 to the passageway 45, and the conduit 43 leads to the cutting tool 12A on the reciprocating ram 11, Figure 1. A suitable manually operable valve 44 may be arranged in the line 43 for controlling the flow of lubricating oil from the pump to the cutting tool 12A.

Slidably mounted in the lower portion of the pump housing 18 is a plunger or rod 46 which has an enlarged portion 47 and a reduced diameter cylindrical portion 48. A discharge plug 49 is arranged in the bottom of the chamber 29, Figure 3. A bushing 50 is mounted adjacent one end of the chamber 29, and the bushing 50 is provided with a plurality of apertures 51 for the egress therethrough of lubricating oil from the chamber 29, the bushing 50 being integral with the head 34. The bushing 50 is provided with apertures 51 whereby the oil can flow from the chamber 29 to the space 52 and then into the bore 35. In Figure 3, the inner end of the rod 46 is indicated by the numeral 5.

A sleeve 53 surrounds the rod 46, and the sleeves 55 and 53 both are free on the rod 46, the sleeve 55 slidably receiving the reduced diameter portion 48 of the rod 46. A coil spring 56 is interposed between the sleeve 55 and the sleeve 53, the coil spring 56 being arranged in the chamber 29. The sleeves 53 and 55 slidably receive the reduced diameter portion 48 and also support the spring 56, the spring 56 serving to hold the sleeve 53 against the partition 31 to help keep the cutting oil from entering the chamber 30. The spring 56 also holds the sleeve 55 against the head 34 and the diameter of sleeve 55 is such that there will be no interference with oil flowing through the apertures 51. The part 54 designates an O ring which is made in a circle out of round rubber. The purpose of this O ring which fits in a recess machined in the chamber 30 is to keep the cutting oil out of the chamber 30. A sleeve 57 extends into the other chamber 30, and the sleeve 57 slidably receives the rod 46 and there is also provided a collar 58 which is secured to the rod 46 by a pin 59. A second coil spring 60 is positioned in the chamber 30 and is circumposed on the rod 46, the coil springs serving to normally maintain the rod 46 in the position shown in Figure 3. However, as the ram 11 reciprocates, the projecting end 47 of the rod 46 will contact a bar 63 to thereby force the rod 46 inwardly from the position shown in Figure 3 compressing the spring 60. The sleeve 57 slidably receives the portion 46 and one end of the sleeve supports the spring 60 and the other side thereof presses against the O ring 54. As the rod 46 is moved inwardly by contact with the bar 63, the small amount of oil which is present in the bore 35 will be forced from right to left in Figure 3 and at the same time the ball 37 will be moved off of its seat 36 so that the oil can flow by gravity or be forced by the rod out through the conduit 43 and onto the cutting tool 12A. When the ram 11 moves away from the bar 63 of the adjustable stop, the coil spring 60 will return the rod 46 to the position shown in Figure 3 whereby the spring 38 will cause the valve 37 to seat on the valve seat 36 so that no further oil can flow out onto the cutting tool to thereby prevent wasting of lubricating oil.

A head 61 is detachably connected to the pump housing 18, and a plug 62 may be threaded into the head 61 for slidably receiving the rod 46.

The bar 63 is part of an adjustable stop mechanism 64 which is shown in detail in Figures 7 through 11. The adjustable stop mechanism 64 includes a rail 65 that may be secured to a stationary part of the shaper or other machine by suitable securing elements such as screws or bolts 66. The adjustable stop further includes a block 67 that is adjustably mounted on the rail 65, Figure 7, and a strip 68 is arranged contiguous to the top of the rail 65, there being a suitable slot in the lower portion of the block 67 for receiving the strip 68 and rail 65, Figure 10. Extending upwardly from the strip 68 is a vertically disposed shank 69 which is provided with an upper pointed end 70. Arranged at right angles with respect to the shank 69 is an exteriorly threaded bolt 71 which has a knurled knob 72 on its outer end for manually rotating the latter. The inner end of the bolt 71 is pointed as at 73 for frictionally engaging the pointed end 70. Thus, by manually adjusting the bolt 71 so that the pointed ends 73 and 70 engage as shown in Figure 10, the shank 69 will be forced downwardly to thereby cause the strip 68 to clampingly engage the rail 65 whereby the block 67 will be maintained immobile in its various adjusted positions. However, in the event that an accident occurs and an excessive amount of shock or pressure is transmitted to the projecting end of the bar 63, the pointed end 73 will move out of engagement with the pointed end 70 to permit the entire block 67 to be shifted whereby damage to the parts will be prevented.

A means is provided for permitting an additional adjustment of the bar 63, and this means comprises or includes a cutout 74 which is arranged in the upper portion of the block 67. A stem 75 extends from the bar 63 and is secured thereto or formed integral therewith, and the stem 75 is provided with an elongated slot 76, Figure 7. A knurled knob 77 is rotatably mounted in a cutout 79 in the block 67, and a key 78 operatively connects the knob 77 to the stem 75 through the medium of the keyway 76. Thus, upon manual rotation of the knurled knob 77, the stem 75 and bar 63 will be shifted longitudinally in the block 67 so that the effective striking distance between the bar 63 and rod 46 can be varied as desired whereby the quantity of oil delivered by the lubricating system to the cutting tool 12A can be controlled accurately as desired. A suitable spring member 80 is positioned in the cutout 79 for frictionally engaging the knob 77 so as to prevent accidental rotation of the knob 77. A plug 81 may be provided for the chamber 30, whereby a proper amount of lubricating oil can be supplied to the chamber 30. The chamber 30 is not filled with lubricating oil so that the rod 46 will be free to reciprocate in the pump housing.

From the foregoing it is apparent that a tool oiler has been provided for a machine such as a shaper. In use the parts are mounted as shown in the drawings and then upon actuation of the machine so that the ram 11 reciprocates on the support member 9, a predetermined amount of oil will be discharged through the tube 43 onto the cutting tool 12A. This is brought about by contact between the bar 63 and rod 46 since contact between these two members causes the rod 46 to move from right to left or inwardly as shown in Figure 3. As the rod 46 is moved inwardly into the pump housing 18, the oil which is in the bore 35 will be moved from right to left and at the same time the inner end of the rod 46 will move the ball 37 from its seat 36 so that this oil can pass through the cutout 39, through the bore 45 and through the conduit 43 onto the cutting tool 12A. This contact between the bar 63 and rod 46 occurs as the ram 11 moves to its rearward position, and when the ram 11 moves forwardly the bar 63 will not engage the rod 46 so that the springs in the chambers will move the rod 46 back to the position shown in Figure 3 so that no further oil will be discharged onto the cutting tool. The auxiliary reservoir 24 can be used for supplying additional oil to the reservoir 22 if desired. The stroke or timing between the bar 63 and rod 46 can be controlled by adjusting the adjustable stop mechanism 64. Thus, several adjustments are possible such as for example the knob 72 can be rotated to permit shifting of the block 67 along the rail 65 until the block 67 is in the desired position after which the knob 72 can be rotated to the position shown in Figure 10 so that the pointed ends 73 and 77 frictionally engage each other to maintain the parts immobile in their adjusted positions. An additional adjustment is provided by means of the knurled knob 77 which can be rotated to shift the bar 63 longitudinally in the block 67 in order to properly position the bar 63 where desired.

The tube 43 can be made of any suitable material such as copper so that it can be bent to assume the desired shape. The oiler of the present invention can be used on other machines besides a shaper such as for example a planer, slotter, or the like. The oil from the tube 43 runs down the front of the cutting tool 12A which is where the oil is needed. The pump housing 18 is secured to the reciprocating ram 11. After the adjustable stop 64 has been adjusted its parts remain immobile. The parts 34 and 61 may be provided with recesses whereby a suitable tool can be arranged in engagement with these recesses for rotating the plug 40, head 34, and part 61 when these parts are to be removed or replaced. The head 34 is machined at one end to fit into the chamber 29 and it will be seen that one end of the head 34 provides or forms a bushing 50 which has a plurality of apertures 51 for the egress therethrough of lubricating oil from the chamber 29. This machined end of part 34 that screws into the chamber 29 has the apertures 51 so that the oil can flow from the chamber 29 into the space 52 and then into the bore 35. The tool oiler of the present invention can be used with suitable connections to provide cutting oil to the cutting tool or any surface work, slotting or keyway cutting.

I claim:

1. An oiler for a shaper including a stationary support member, a movable ram, a cutting tool carried by said ram, and a guide rail, said oiler comprising a plate secured to said ram, a housing secured to said plate and provided with an oil reservoir therein, a filling plug detachably connected to said housing, said reservoir including a bottom wall provided with an opening for the egress therethrough of oil from said reservoir, a first and second chamber arranged below said bottom wall, said first chamber communicating with said opening, a partition separating said pair of chambers, a rod slidably extending through said chambers, a head detachably connected to said housing and provided with a bore for slidably receiving an end of said rod, passages connecting said first chamber to said bore, a spring pressed ball valve for controlling passage of oil through said bore, a conduit leading from said bore to said cutting tool, resilient means for urging said rod away from said valve, and an adjustable stop on said rail adapted to be contacted by said rod upon reciprocation of said ram.

2. The apparatus as described in claim 1, wherein said resilient means comprises coil springs positioned in said chambers and circumposed on said rod.

3. The apparatus as described in claim 1, wherein said adjustable stop comprises a block provided with a slot for slidably receiving said rail, a strip mounted in said slot on said rail, a shank extending upwardly from said strip and provided with an upper pointed end, and a threaded securing element extending into said block at right angles to said shank and provided with an inner pointed tip for engaging the pointed end of said shank.

4. An oiler for a shaper including a stationary support member, a movable ram, a cutting tool carried by said ram, and a guide rail, said oiler comprising a plate secured to said ram, a housing secured to said plate and provided with an oil reservoir therein, a filling plug detachably connected to said housing, said reservoir including a bottom wall provided with an opening for the egress therethrough of oil from said reservoir, a first and second chamber arranged below said bottom wall, said first chamber communicating with said opening, a partition separating said pair of chambers, a rod slidably extending through said chambers, a head detachably connected to said housing and provided with a bore for slidably receiving an end of said rod, passages connecting said first chamber to said bore, a spring pressed ball valve for controlling passage of oil through said bore, a conduit leading from said bore to said cutting tool, resilient means for urging said rod away from said valve, and an adjustable stop on said rail adapted to be contacted by said rod upon reciprocation of said ram, said adjustable stop comprising a block provided with a slot for slidably receiving said rail, a strip mounted in said slot on said rail, a shank extending upwardly from said strip and provided with an upper pointed end, a threaded securing element extending into said block at right angles to said shank and provided with an inner pointed tip for engaging the pointed end of said shank, said block being provided with an elongated cutout, a cylindrical bar positoned slidably in said cutout and adapted to be engaged by said rod, a stem extending from an end of said bar, and a knurled knob rotatably mounted in said block and connected to said stem.

5. The apparatus as described in claim 4, and further including a spring member frictionally engaging said knurled knob.

6. An oiler for a shaper including a support member, a movable ram, a cutting tool carried by said ram, and a guide rail, said oiler comprising a housing secured to said ram and provided with an oil reservoir therein, a filling plug detachably connected to said housing, said reservoir being provided with an opening for the egress therethrough of oil from said reservoir, a first and second chamber arranged below said reservoir, said first chamber communicating with said opening, a partition separating said pair of chambers, a rod slidably extending through said chambers, a head detachably connected to said housing and slidably receiving an end of said rod, passages connecting said first chamber to said bore, a valve for controlling passage of oil through said bore, a conduit leading from said bore to said cutting tool, resilient means for urging said rod away from said valve, and a stop on said rail adapted to be contacted by said rod upon reciprocation of said ram.

References Cited in the file of this patent

UNITED STATES PATENTS

| | | |
|---|---|---|
| 1,271,140 | Dickey | July 2, 1918 |
| 2,074,257 | Ernst et al. | Mar. 16, 1937 |
| 2,250,349 | Berquist | July 22, 1941 |
| 2,437,605 | Karge | Mar. 9, 1948 |
| 2,588,676 | Walter | Mar. 11, 1952 |